United States Patent [19]

Unuma

[11] Patent Number: 5,026,328

[45] Date of Patent: Jun. 25, 1991

[54] BELT DRIVING SPROCKET IN PAPER FEEDER

[75] Inventor: Sadao Unuma, Yokonemachi, Japan

[73] Assignee: Tokai Kogyo Kabushiki Kaisha, Aichi, Japan

[21] Appl. No.: 517,684

[22] Filed: May 2, 1990

[30] Foreign Application Priority Data

May 19, 1989 [JP] Japan ................................ 1-127062

[51] Int. Cl.[5] ................................ F16H 7/02

[52] U.S. Cl. ................................ 474/153; 226/74; 474/197

[58] Field of Search ................................ 474/197, 152, 153; 29/893, 893.37, 893.1; 198/83 F; 271/34, 275, 198

[56] References Cited

U.S. PATENT DOCUMENTS

| | | | |
|---|---|---|---|
| 1,922,357 | 6/1932 | Divney et al. | 474/152 |
| 3,771,843 | 11/1973 | Clasper et al. | 474/197 |
| 4,130,230 | 12/1978 | Seitz | 226/75 |
| 4,214,691 | 7/1980 | Van Namen | 226/74 |
| 4,469,263 | 9/1984 | Seitz | 226/74 |
| 4,472,531 | 7/1984 | Seitz | 226/74 |
| 4,479,598 | 10/1984 | Mailer et al. | 226/74 |
| 4,826,337 | 5/1989 | Unuma | 271/34 |
| 4,836,431 | 6/1989 | Hirth et al. | 226/74 |

*Primary Examiner*—Bruce M. Kisliuk
*Assistant Examiner*—Roger J. Schoeppel
*Attorney, Agent, or Firm*—Wenderoth, Lind & Ponack

[57] ABSTRACT

A feed belt driving sprocket has a body molded of an elastic material. Two side faces of an inner circumferential portion of the sprocket body, except an outer circumferential portion formed with teeth, are formed with round fitting recesses concentric with an axial hole therein such that the inner circumferential portion of the sprocket body is thinner than the outer circumferential portion. The axial hole formed at the center of the sprocket body has small protrusions on its inner circumferential faces. Notched holes are provided in the sprocket body for facilitating elastic deformation of portions of the sprocket body. If a drive shaft is fitted into the axial hole of the sprocket body, the portions of the sprocket body near the axial hole are partially elastically deformed. The clearance between the drive shaft and the axial hole of the sprocket body is thus eliminated and the sprocket is immovably fitted onto the drive shaft. Portions of the sprocket body near the axial hole are elastic such that the small protrusions come into elastic contact with the outer circumferential faces of the drive shaft. Thus the contact between the sprocket body and drive shaft is a linear or point contact, establishing a relatively small sliding resistance therebetween. Thus a paper feeder can be moved in the axial direction of the drive shaft by a small force. During paper feed, any phase difference in rotation between the drive shaft and the sprocket can be eliminated.

2 Claims, 8 Drawing Sheets

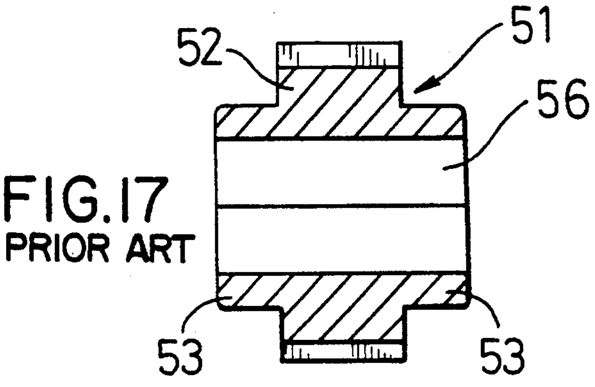
FIG.17
PRIOR ART
FIG.18
PRIOR ART
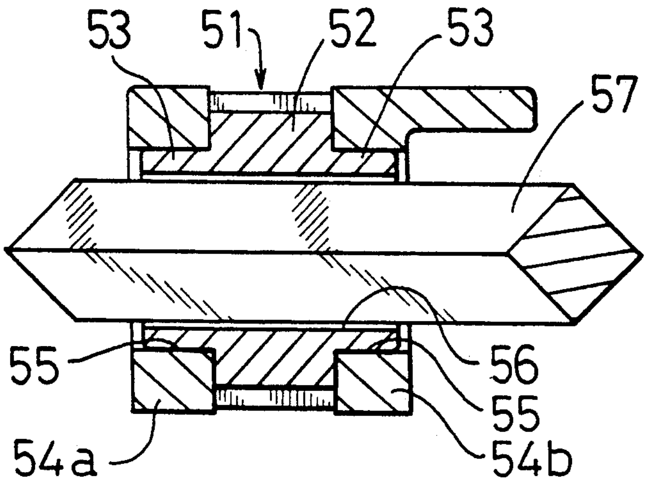
FIG.19
PRIOR ART
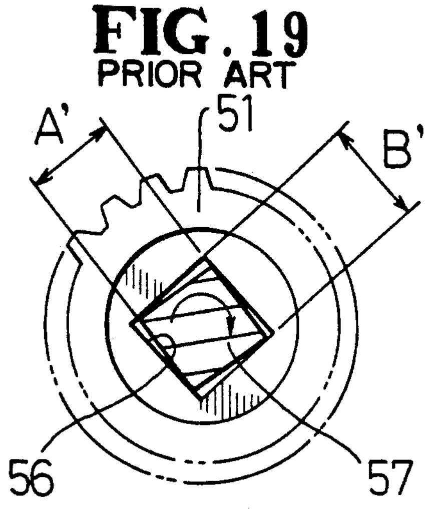

BELT DRIVING SPROCKET IN PAPER FEEDER

BACKGROUND OF THE INVENTION

1. Field of the Invention

The present invention relates to a structure for a feed belt driving sprocket in a paper feeder, which can be so fitted on a drive shaft that it is absolutely immovable in the direction of rotation.

2. Description of the Prior Art

The drive of the feed belt of the paper feeder is accomplished by means of a sprocket.

Specifically, a feed belt is fitted on both a sprocket, which is borne at one-end portions of a pair of side frames opposed to each other at a predetermined spacing, and a mounting member disposed at the other end portions of the same, and is circulated to run by the driving rotations of the sprocket.

The sprocket now in use at present and the structure for bearing the sprocket in the paired side frames are shown in FIGS. 17 to 19.

A sprocket 51 has its body 52 protruding at its two sides to form fitted portions 53. The sprocket 51 is rotatably borne in a pair of side frames **54*a* and 54*b* by having its fitted portions 53 fitted in fitting holes 55 formed in the side frames 54*a* and 54*b*. Moreover, the sprocket 51 is formed with a square-shaped axial hole 56 so that it is rotated by inserting a square-shaped drive shaft 57 into the axial hole 56 and by rotating the drive shaft 57**.

As quite natural, the spacing (A') between the opposed sides of the drive shaft 57 is made smaller than the spacing (B') between the opposed inner peripheral sides of the axial hole 56 so that a slight clearance is left between the axial hole 56 and the drive shaft 57 fitted in the former. As a result, as shown in FIG. 19, the sprocket 51 is slightly moved in its rotating direction from the drive shaft 57 so that a phase difference is established for each rotation during the paper feed between the drive shaft 57 and the sprocket 51 to deteriorate the printing accuracy of the printer.

In order to prevent this drawback, it is advisable to minimize the clearance between the axial hole 56 of the sprocket 51 and the drive shaft 57 as much as possible. However, a pair of paper feeders have to be used to adjust their gap in accordance with the paper width.

For this necessity, the paper feeders have to be moved as a whole along the drive shafts 57 by a weak force. For an excessively small clearance, therefore, the drive shaft 57 can be inserted into the axial hole 56 of the sprocket 51, but the whole paper feeder can hardly be moved along the drive shaft 57, or the drive shaft 57 may be unable to be inserted into the axial hole 56 of the sprocket 51, as the case may be.

As a result, the sprocket of the single structure has found it difficult to simultaneously achieve the elimination of the phase difference of each rotation between the drive shaft and the sprocket and the movement of the whole paper feeder by the small force. This simultaneous achievement of the two requirements could be effected if the sprocket were equipped with a special part for preventing the sprocket from moving in the direction of rotation relative to the drive shaft. In this case, however, the equipment will raise the production cost and cannot expect a high accuracy.

SUMMARY OF THE INVENTION

A feed belt driving sprocket according to the present invention has its body molded of an elastic material such as a synthetic resin. The two side faces of the inner circumferential portion of the sprocket body excepting the outer circumferential portion formed with teeth are formed with round fitting recesses concentrically with an axial hole formed therein so that the inner circumferential portion of the sprocket body is made thinner than that of the outer circumferential portion. The axial hole formed at the center of the sprocket body is formed on its inner circumferential faces with small protrusions. The sprocket body is formed at its portions near the axial hole with notched holes for facilitating the elastic deformations of those portions.

If round fitted lands protruded from the inner side faces of the paired side frames are fitted in the fitting recesses formed in the two side faces of the sprocket body, the sprocket is so interposed between the paired side frames that it is rotatably borne by the paired side frames. If, moreover, the drive shaft is fitted in the axial hole of the sprocket body, the portions of the sprocket body near the axial hole are partially deformed elastically, the small protrusions formed on the inner circumferential faces of the axial hole are brought into elastic contact with the outer circumferential faces of the drive shaft. As a result, the clearance between the drive shaft and the axial hole of the sprocket body is eliminated so that the sprocket is fitted on the drive shaft absolutely immovably in the direction of rotation relative to the drive shaft.

Moreover, the portions of the sprocket body near the axial hole are elastically deformed so that the small protrusions formed on the inner circumferential faces of the axial hole come into elastic contact with the outer circumferential faces of the drive shaft. Thus, the contact between the sprocket body and the drive shaft is a linear or point contact to establish a relatively small sliding resistance inbetween. As a result, the whole paper feeder can also be moved in the axial direction of the drive shaft even by a weak force.

Thus, during the paper feed, the phase difference in the rotations between the drive shaft and the sprocket fitted on the former can be eliminated by the sprocket of the monoblock structure, and the whole paper feeder can also be moved along the drive shaft even by the small force.

BRIEF DESCRIPTION OF THE DRAWINGS

FIG. 1 is an exploded perspective view showing a paper feeder 1 equipped with a sprocket $S_1$ according to the present invention;

FIG. 2 is an enlarged perspective view showing the sprocket $S_1$ and a drive shaft 7;

FIG. 3 is a side elevation showing the paper feeder 1 equipped with the sprocket $S_1$ according to the present invention;

FIG. 4 is a view taken along line X—X of FIG. 3;

FIG. 5 is a section taken along line Y—Y of FIG. 3 in the status in which the drive shaft 7 and a support shaft 9 are inserted;

FIG. 6 is a front elevation showing the sprocket $S_1$;

FIG. 7 is a section of the drive shaft 7;

FIG. 8 is a section taken along line Z—Z of FIG. 6;

FIG. 9 is a section of a portion of the sprocket $S_1$ taken in the axial direction of the drive shaft 7 in the status in which the drive shaft 7 is inserted into an axial hole 27 of the sprocket $S_1$;

FIG. 10 is a section of the sprocket $S_1$ taken in the direction perpendicular to the drive shaft 7 in a similar status;

FIGS. 11 and 12 are a front elevation of a sprocket $S_2$ and a section in the status in which the drive shaft 7 is inserted into the axial hole 27 of the sprocket $S_2$, respectively;

FIGS. 13 and 14 are a front elevation of a sprocket $S_3$ and a section in the status in which the drive shaft 7 is inserted into the axial hole 27 of the sprocket $S_2$, respectively; and FIGS. 15 and 16 are a front elevation of a sprocket $S_4$ and a section in the status in which the drive shaft 7 is inserted into the axial hole 27 of the sprocket $S_2$, respectively.

In FIGS. 17 to 19 for explaining the prior art;

FIG. 17 is a section of the sprocket 51 of the prior art taken along in the direction of the axial hole 56;

FIG. 18 is a section taken in the direction of the drive shaft 57 in the status in which the drive shaft 57 is inserted into the sprocket 51 arranged between and borne by the paired side frames 54*a* and 54*b*; and FIG. 19 is a diagram for explaining the phenomenon in which the sprocket 51 and the drive shaft 57 come out of shift in the direction of rotation.

DESCRIPTION OF THE PREFERRED EMBODIMENTS

Figure 1:
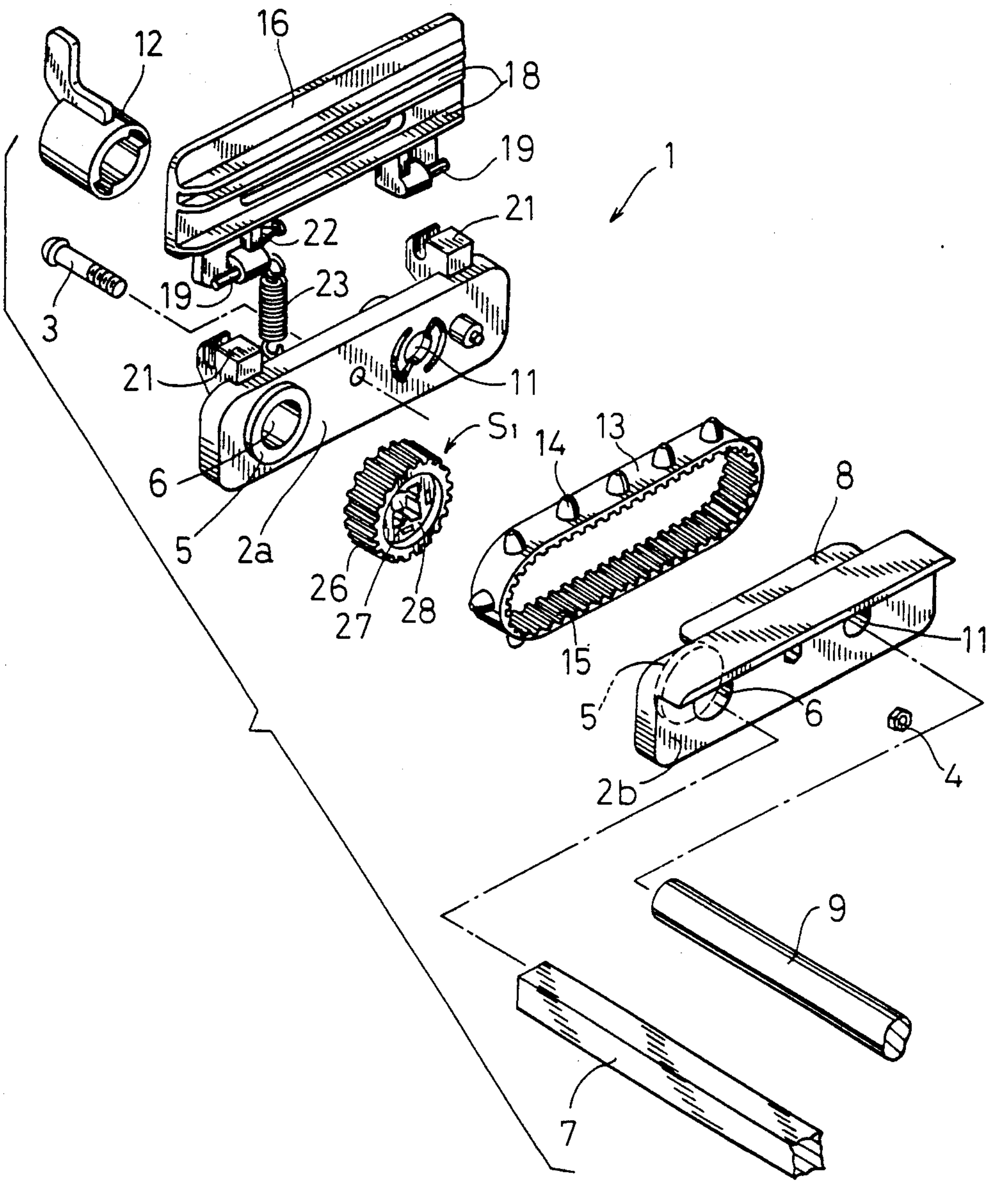
In FIGS. 1 to 16 are views for explaining the present invention.
Figure 2:
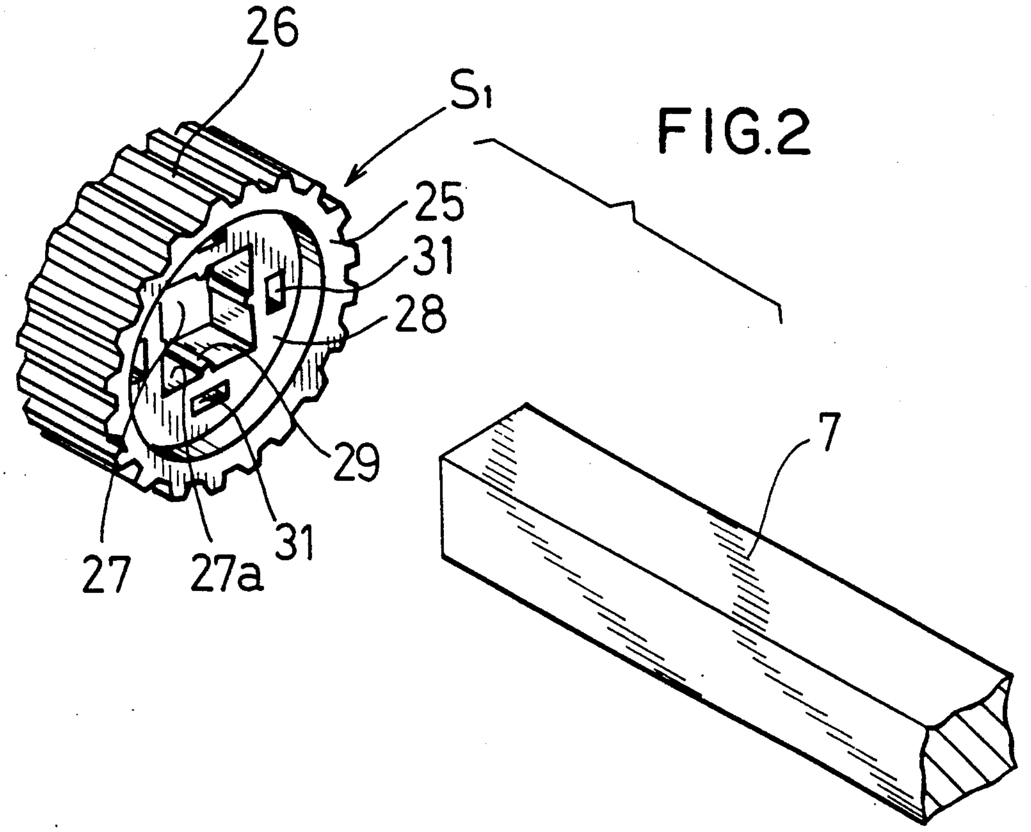
Figure 3:
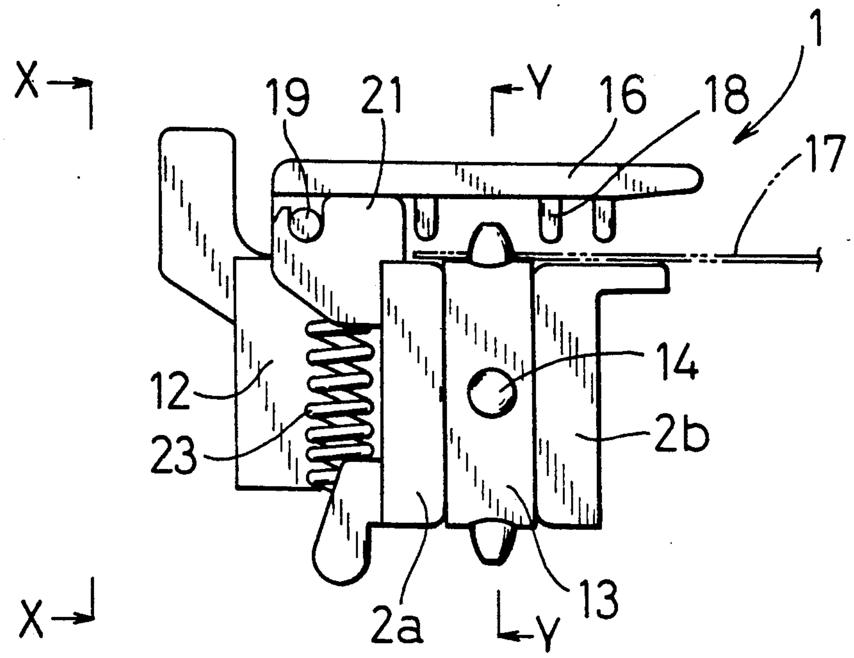
Figure 4:
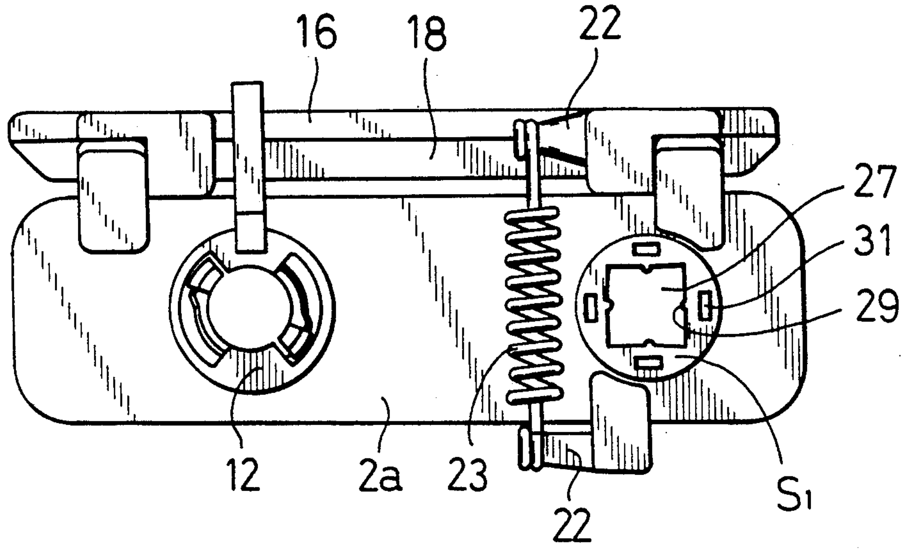

With reference to FIGS. 1 to 5, descriptions will be made at first in brevity upon the summary of a paper feeder 1 and then in detail upon the portion of a sprocket $S_1$ according to the present invention.

A pair of side frames 2*a* and 2*b* are connected at a predetermined spacing to each other by means of connecting bolts 3 and nuts 4. Each of the side frames 2*a* and 2*b* has its inner side face protruding at its longitudinal one end portion to form a round fitted land 5, which is to be fitted in a later-described fitting recess 28 of the sprocket $S_1$. The portion of each side frame 2*a* or 2*b* formed with the fitted land 5 is formed with a through insertion hole 6 which is concentric with the corresponding fitted land 5. The insertion hole 6 thus formed is one for inserting a drive shaft 7.

Figure 5:
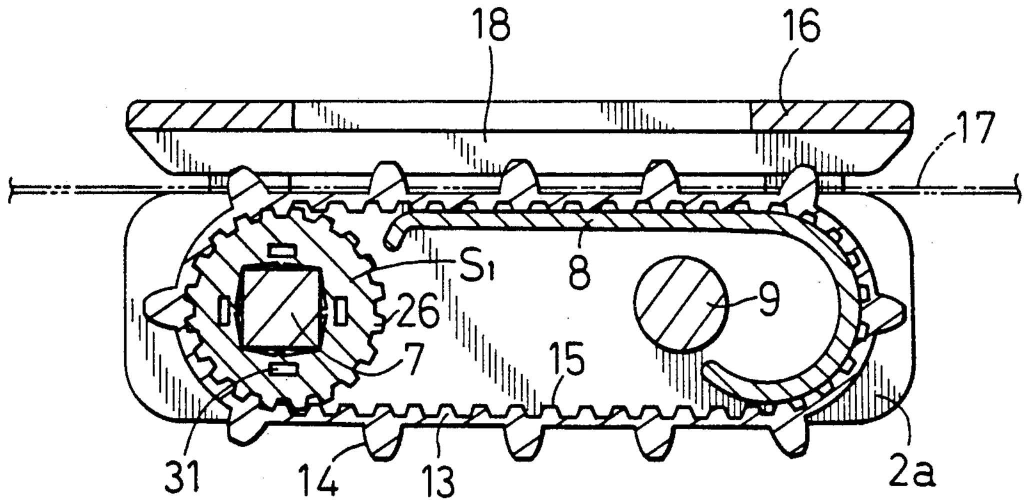
Figure 6:
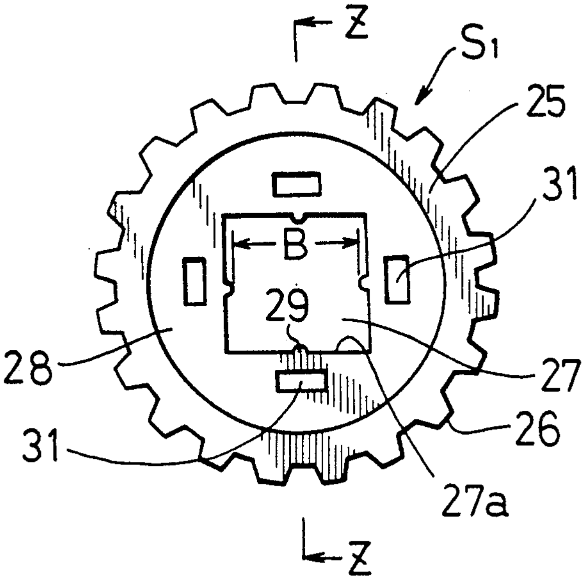
Figure 7:
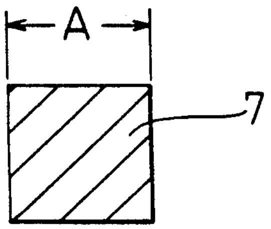

One side frame 2*b* is formed on its inner side face with a belt guide 8 which has its one end portion (opposite to the end portion formed with the fitted land 5) formed into an arcuate shape (as shown in FIG. 5).

Each side frame 2*a* or 2*b* is formed, at its end portion opposite to that formed with the insertion hole 6, with another insertion hole 11 for inserting a support shaft 9. This support shaft 9 is fixed, after it is inserted into the insertion holes 11 of the individual side frames 2*a* and 2*b*, on the side frame 2*a* by means of a clamp member 12 so that the paper feeder 1 is fixed in its entirety on the support shaft 9.

An endless feed belt 13 has its outer periphery implanted at a constant pitch with a number of feed pins 14 and its inner periphery formed with internal teeth 15.

A cover 16 has its back side formed with a plurality of protruding guide ribs 18 which are arranged in the paper feeding direction so as to prevent a sheet of paper 17 being fed from being floated. The cover 16 is equipped with a pair of support pins 19, and one side frame 2*a* is equipped with a pair of cover receiving portions 21 corresponding to the paired support pins 19. The cover 16 is so mounted on the side frame 2*a* that it can be opened or closed, by inserting the individual support pins 19 of the cover 16 into the corresponding cover receiving portions 21 of the side frame 2*a* and by anchoring the two end portions of a tension spring 23 on spring arms 22 which are formed on the cover 16 and the side frame 2*a*.

Next, the sprocket $S_1$ having the structure according to the present invention will be described in the following with reference to FIG. 2 and FIGS. 6 to 10.

This sprocket $S_1$ is molded of an elastic material such as a synthetic resin like the ordinary sprocket such that its body 25 is formed at its outer circumference with teeth 26 and at its central portion with a square-shaped axial hole 27. The sprocket body 25 is formed, at its two sides of the inner circumference portion excepting the outer circumference formed with the teeth 26, with the round fitting recesses 28 concentric with the axial hole 27. As a result, the sprocket body 25 is made thinner at its inner circumference portion than at the outer circumference portion.

Each of flattened inner circumferential faces 27*a* of the axial hole 27 formed in the sprocket body 25 is formed at its central portion with a small ridge 29 which is extended in the direction of the center line of the axial hole 27. The sprocket body 25 is formed near the axial hole 27 with a plurality of notched holes 31. Each of these notched holes 31 is positioned to correspond to the aforementioned small ridge 29 formed on the inner circumferential face 27*a* of the axial hole 27, to facilitate the elastic deformation of the thin portion of the sprocket body 25 near the axial hole 27.

The spacing (A) between the opposed faces of the square-shaped drive shaft 7 is made slightly larger than the spacing (B) between the small ridges 29 which are protruded from the opposed inner circumferential faces 27*a* of the axial hole 27 of the sprocket body 25.

Figure 8:
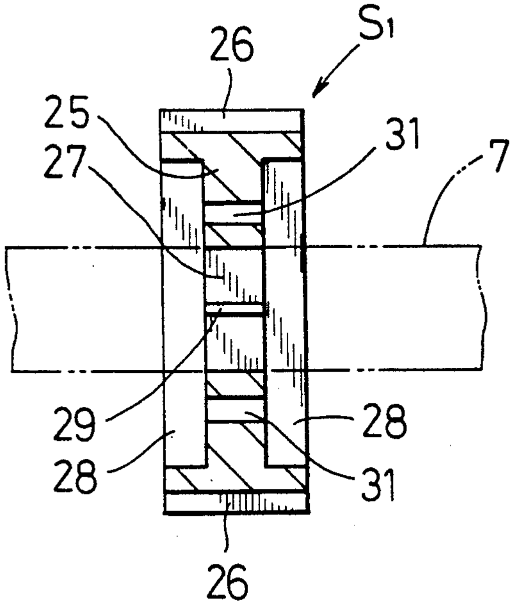
Figure 9:
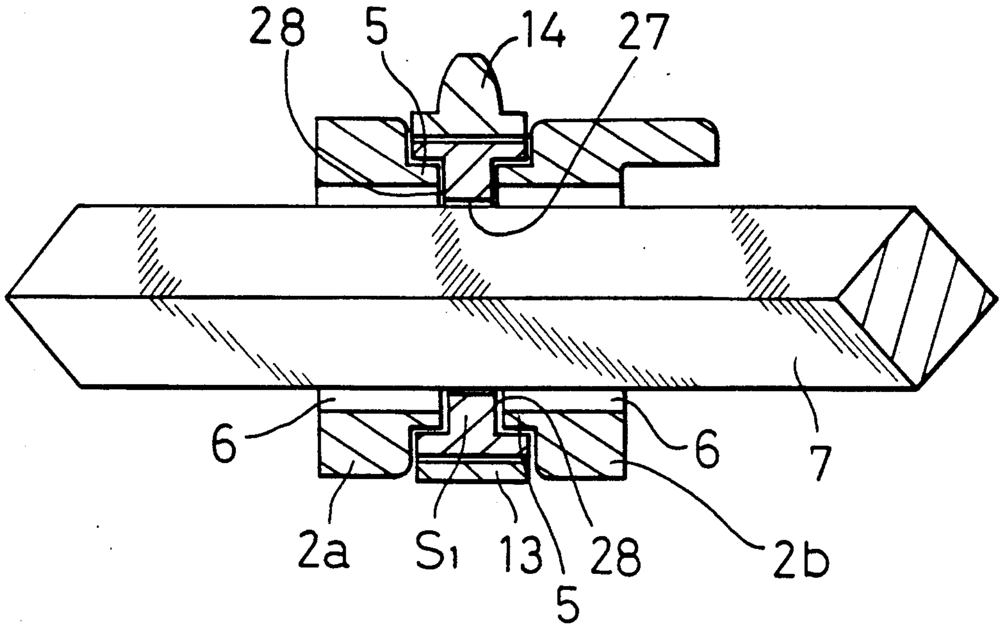

If the aforementioned fitted lands 5 protruded from the inner side faces of the paired side frames 2*a* and 2*b* are fitted in the fitting recesses 28 formed in the two side faces of the sprocket body 25, as shown in FIGS. 8 and 9, the sprocket $S_1$ is interposed between the paired side frames 2*a* and 2*b* such that it is rotatably borne by the paired side frames 2*a* and 2*b*. Thus, the endless feed belt 13 is made to run on the sprocket $S_1$ borne between the paired side frames 2*a* and 2*b* and the belt guide 8 formed on the inner side face of the side frame 2*b*. The feed belt 13 has its inner teeth 15 meshing with the teeth 26 of the sprocket $S_1$.

Figure 10:
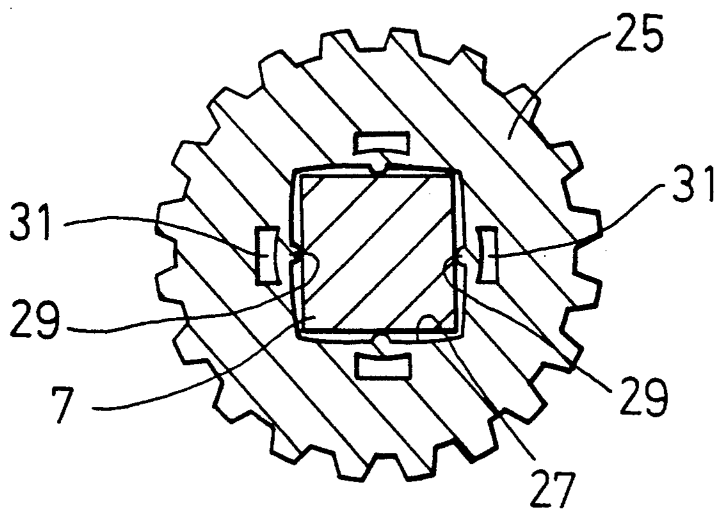

If, moreover, the drive shaft 7 is inserted into the axial hole 27 of the sprocket body 25, the thin portion of the sprocket body 25 near the axial hole 27 is elastically deformed, as shown in FIG. 10, so that the small ridges 29 protruded from the inner circumferential faces 27*a* of the axial hole 27 are brought into elastic contact with the outer circumference of the drive shaft 7 in a linear state. This is partly because the spacing (A) between the opposite faces of the square-shaped drive shaft 7 is made slightly larger than the spacing (B) between the small ridges 29 formed on the opposed inner circumferential faces 27*a* of the axial hole 27 of the sprocket body 25, as has been described hereinbefore, and partly because the portion of the sprocket body 25 near the axial hole 27 is made thin.

As a result, the drive shaft 7 can be inserted without any clearance into the axial hole 27 of the sprocket $S_1$, and the sprocket $S_1$ can be made immovable in the direction of rotation relative to the drive shaft 7 so that it is always rotated integrally with the drive shaft 7 not only during the paper feed but also at the start. This establishes no phase difference in the direction of rotation between the sprocket $S_1$ and the drive shaft 7.

Moreover, the elastic contact between the small ridges 29 protruded from the inner circumferential faces 27*a* of the axial hole 27 and the drive shaft 7 is partial and linear, and the small ridges 29 are formed in the direction of the center line of the axial hole 27. As a result, the sliding resistance between the small ridges 29 and the drive shaft 7 is so relatively small that the sprocket $S_1$ (or the paper feeder 1) can be moved along the drive shaft 7 by a weak force. Thus, the spacing of the paired paper feeders 1 can be easily adjusted in accordance with the width of the paper 17.

Sprockets $S_2$, $S_3$ and $S_4$ according to other embodiments of the present invention are shown in FIGS. 11 to 16.

Figure 11:
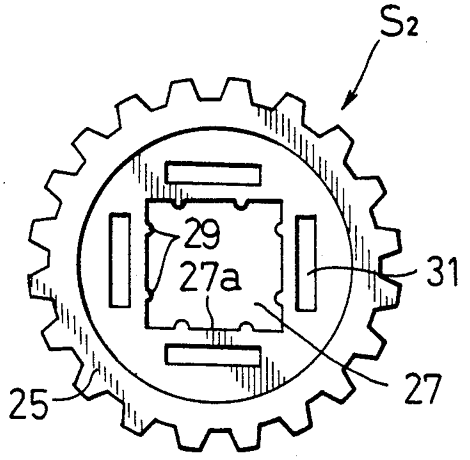
Figure 12:
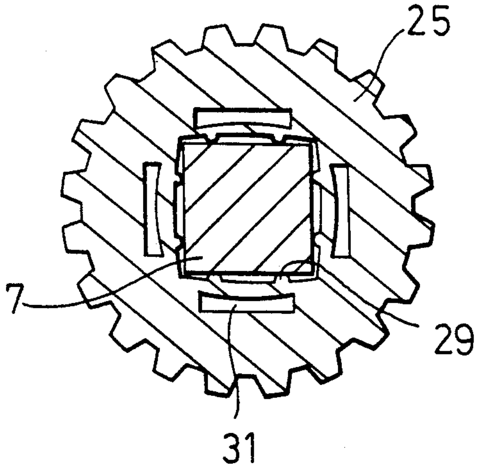

In the sprocket $S_2$ shown in FIGS. 11 and 12, each of flattened inner circumferential faces 27*a* of the axial hole 27 formed in the sprocket body 25 is formed with two small ridges 29. The contact area between the inner circumferential faces 27*a* of the axial hole 27 and the drive shaft 7 can be substantially twice as large as that of the foregoing sprocket $S_1$ so that the elastic contact force of the drive shaft 7 by the sprocket body 25 can be accordingly increased.

Figure 13:
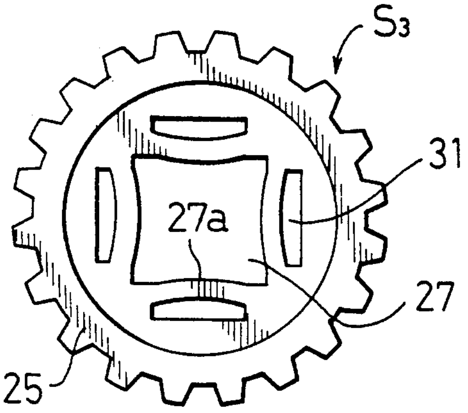
Figure 14:
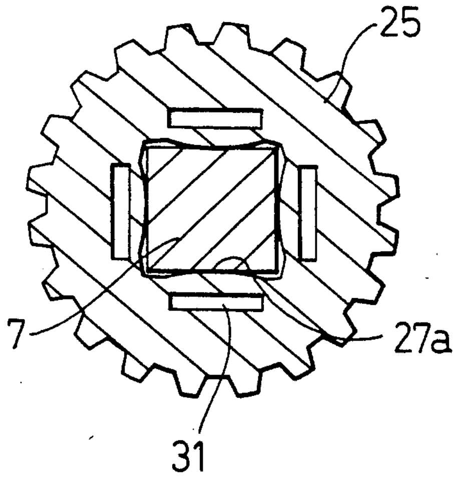

In the sprocket $S_3$ shown in FIGS. 13 and 14, moreover, each of flattened inner circumferential faces 27*a* of the axial hole 27 formed in the sprocket body 25 is gently bulged so that the contact area between the inner circumferential faces 27*a* of the axial hole 27 and the drive shaft 7 can be made larger than that of the aforementioned sprocket $S_1$.

Figure 15:
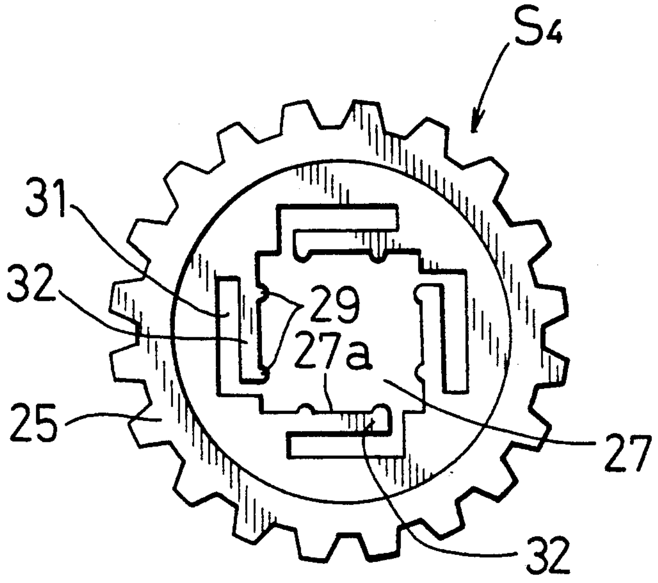
Figure 16:
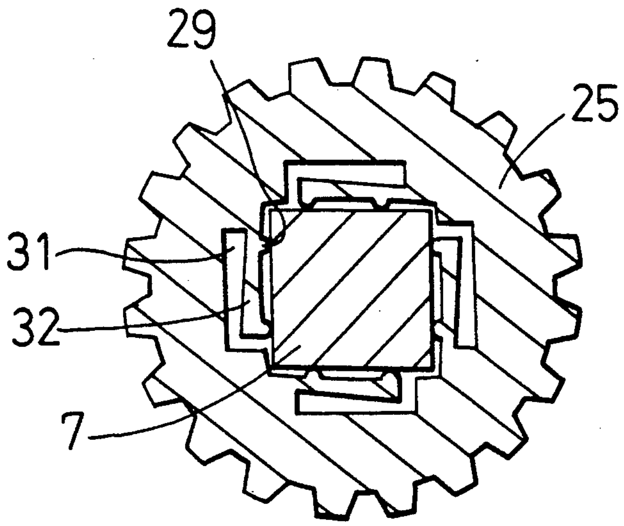

In the sprocket $S_4$ shown in FIGS. 15 and 16, still moreover, the aforementioned sprocket $S_2$ is modified by connecting the axial hole 27 and one-end portions of the notched holes 31 are connected to form elastic cantilever members 32 around the axial hole 27 so that the portions of the sprocket body 25 near the axial hole 27 may be more deformed elastically.

In any of the individual embodiments thus far described, the inner circumferential faces 27*a* of the axial hole 27 of the sprocket body 25 are formed with the small ridges 29, which may be replaced by a number of small protrusions. On the other hand, the aforementioned side frames are constructed by connecting the paired separated side frames by means of the connecting bolts. Despite of this structure, however, the sprocket according to the present invention can be borne in a monoblock frame, in which a pair of side frames are so integrally molded that they are opposed to each other at a predetermined spacing.

What is claimed is:

1. A structure for a feed belt driving sprocket for use in a paper feeder comprising:

a pair of side frames opposed to each other at a predetermined spacing;

an endless feed belt interposed between said pair of side frames;

a sprocket adapted to be interposed between said pair of side frames and borne rotatably at first end portions of said pair of side frames;

a guide member disposed at the other end portions of said pair of side frames, wherein said feed belt is adapted to run on said sprocket and said guide member;

a square-shaped axial hole formed at the center of said sprocket adapted to receive a square shaped drive shaft, whereby said feed belt is adapted to be circulated to run by the driving rotations of said sprocket to thereby feed a sheet of paper; and wherein said sprocket is molded as a one piece homogenous body of an elastic material, has a pair of opposed side faces, and has round fitting recesses formed in said pair of opposed side faces on an inner circumferential portion of said sprocket and an outer circumferential portion having teeth thereon concentric with said axial hole such that said inner circumferential portion is thinner than said outer circumferential portion, said square shaped axial hole having four inner faces with protrusions projecting therefrom, and said sprocket further having through holes adjacent to and radially aligned with said protrusions for facilitating elastic deformation of said sprocket adjacent said protrusions;

whereby a drive shaft can be fitted in said square-shaped axial hole of said sprocket to elastically deform said sprocket adjacent said axial hole and said protrusions on said inner faces of said axial hole can be brought into elastic contact with the outer circumferential faces of the drive shaft.

2. A structure for a feed belt driving sprocket according to claim 1, wherein said protrusions are small ridges extending in the axial direction of said axial hole of said sprocket.

* * * * *